United States Patent
Boers et al.

(10) Patent No.: US 7,830,822 B2
(45) Date of Patent: Nov. 9, 2010

(54) SYSTEM AND METHOD FOR PERFORMING KEY-BASED REFRESH OF ROUTING INFORMATION

(75) Inventors: Arjen Boers, Calafell (ES); Swapna R. Yelamanchi, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1060 days.

(21) Appl. No.: 11/265,351

(22) Filed: Nov. 2, 2005

(65) Prior Publication Data

US 2007/0098003 A1    May 3, 2007

(51) Int. Cl.
*H04L 12/16* (2006.01)

(52) U.S. Cl. .................. 370/256; 370/390; 713/156; 713/160

(58) Field of Classification Search .......... 370/432, 370/390, 254, 255, 256; 713/156, 160, 162, 713/201; 709/235
See application file for complete search history.

(56) References Cited

U.S. PATENT DOCUMENTS

| | | | |
|---|---|---|---|
| 6,606,706 B1 * | 8/2003 | Li | 713/162 |
| 6,738,900 B1 * | 5/2004 | Hardjono et al. | 713/156 |
| 7,127,610 B1 * | 10/2006 | Li et al. | 713/163 |
| 2001/0007127 A1 * | 7/2001 | Staring | 713/160 |
| 2005/0185663 A1 * | 8/2005 | Lehtonen | 370/432 |
| 2007/0074275 A1 * | 3/2007 | Bajko et al. | 726/4 |

OTHER PUBLICATIONS

Li, Yunzhou, *Group Specific MSDP Peering*, Nortel Networks, Internet Engineering Task Force, Jun. 4, 1999, pp. i-6.

Berger, et al., *RSVP Refresh Overhead Reduction Extensions*, Network Working Group, Requests for Comments: 2961, Category: Standards Track, Apr. 2001, pp. 1-34.

Kim, et al., *Anycast Rendevous Point (RP) Mechanism Using Protocol Independent Multicast (PIM) and Multicast Source Discovery Protocol (MSDP)*, Network Working Group, Requests for Comments: 3446, Category: Informational, Jan. 2003, pp. 1-7.

Fenner, B. and Meyer, D., *Multicast Source Discovery Protocol (MSDP)*, Network Working Group, Requests for Comments: 3618, Category: Experimental, Oct. 2003, pp. 1-19.

* cited by examiner

*Primary Examiner*—Jason E Mattis
*Assistant Examiner*—Dady Chery
(74) *Attorney, Agent, or Firm*—Campbell Stephenson LLP (57) ABSTRACT

A Multicast Source Discovery Protocol (MSDP) speaker can associate a "key" with a set of one or more source address/group address pairs within a Source Active (SA) message and send the SA message to a MSDP peer. Initially, the MSDP speaker sends both the key and the source address/group address pairs associated with that key. Subsequently, the MSDP speaker can simply resend the key, without also sending all of the associated source address/group address pairs, in order to refresh the SA information at the peer. Additionally, several keys can be sent in a single message.

25 Claims, 7 Drawing Sheets

FIG. 1

| Type 20 | Length 22 | Entry Count 24 |
|---|---|---|
| RP Address 26 |||
| Reserved 28 || Sprefix Len 30 |
| Group Address 32 |||
| Source Address 34 |||
| Encapsulated Data Packet 36 |||

*FIG. 2A*

| Type 20 | Length 22 | Entry Count 24 |
|---|---|---|
| RP Address 26 |||
| A / W 40 | Key 42 ||
| Reserved 28 || Sprefix Len 30 |
| Group Address 32 |||
| Source Address 34 |||
| Encapsulated Data Packet 36 |||

*FIG. 2B*

| Type 20 | Length 22 | # of Keys 50 |
|---|---|---|
| Key 1    52 || Key 2    54 |
| Key 2 (cont.) || Key 3    56 |
| Key 3 (cont.) | Key 4    58 ||

SYSTEM AND METHOD FOR PERFORMING KEY-BASED REFRESH OF ROUTING INFORMATION

FIELD OF THE INVENTION

This invention is related to the field of networking and, more particularly, to refreshing routing information within a network.

DESCRIPTION OF THE RELATED ART

Multicast Source Discovery Protocol (MSDP) is a protocol that allows nodes in one domain to discover multicast sources in remote domains. MSDP was originally designed to allow multiple PIM-SM domains to be connected, allowing each PIM-SM domain to have its own rendezvous point (RP). In this environment, MSDP allows two nodes, each of which is included in a different PIM-SM domain, to share information about sources present in each node's domain.

MSDP is also used in systems that implement redundant rendezvous points (RP) for use in multicast routing. Redundant rendezvous points are established by assigning the same anycast address to each of several rendezvous points within a PIM domain. Domains that implement multiple rendezvous points that share an anycast address are described as implementing anycast-RP. In domains implementing anycast-RP, MSDP relationships can be established between nodes within the same domain in order to propagate source information to each of the redundant rendezvous points.

Nodes that implement MSDP form peer relationships over a Transmission Control Protocol (TCP) connection. Peers then exchange information about multicast sources by periodically exchanging Source-Active (SA) messages. For example, for each multicast source within a first domain, a first MSDP peer can send information identifying the source address, group address (to which the source sends multicast messages), and rendezvous point address (of the rendezvous point for the group) to a second MSDP peer in a second domain. This information is encoded in a Source-Active (SA) message.

Since the SA state information is periodically encoded and transmitted as SA messages, the amount of state information maintained by each node will determine the traffic that arises due to MSDP. When MSDP is used in certain scenarios, such as large scale MVPN networks that implement anycast-RP, the amount of SA state may increase so much that scalability problems arise due to the increased number of SA messages that need to be transmitted. Accordingly, techniques that reduce the number of SA messages that need to be transmitted are desirable.

BRIEF DESCRIPTION OF THE DRAWINGS

A more complete understanding of the present invention may be acquired by referring to the following description and the accompanying drawings, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

A Multicast Source Discovery Protocol (MSDP) speaker can associate a "key" with a set of one or more source address/group address pairs within a Source Active (SA) message and send the SA message to a MSDP peer. Each key is a unique value that corresponds to a particular rendezvous point (RP), as well as to the source information (i.e., the source address/group address pair(s)) that is associated with that RP. Initially, the MSDP speaker sends both the key and the source address/group address pairs associated with that key. Subsequently, the MSDP speaker can simply resend the key, without also sending all of the associated source address/group address pairs, in order to refresh the SA information at the peer. Additionally, several keys can be sent in a single message. This can significantly reduce the amount of MSDP state information that needs to be transmitted in the network, thereby increasing the scalability of MSDP.

Figure 1:
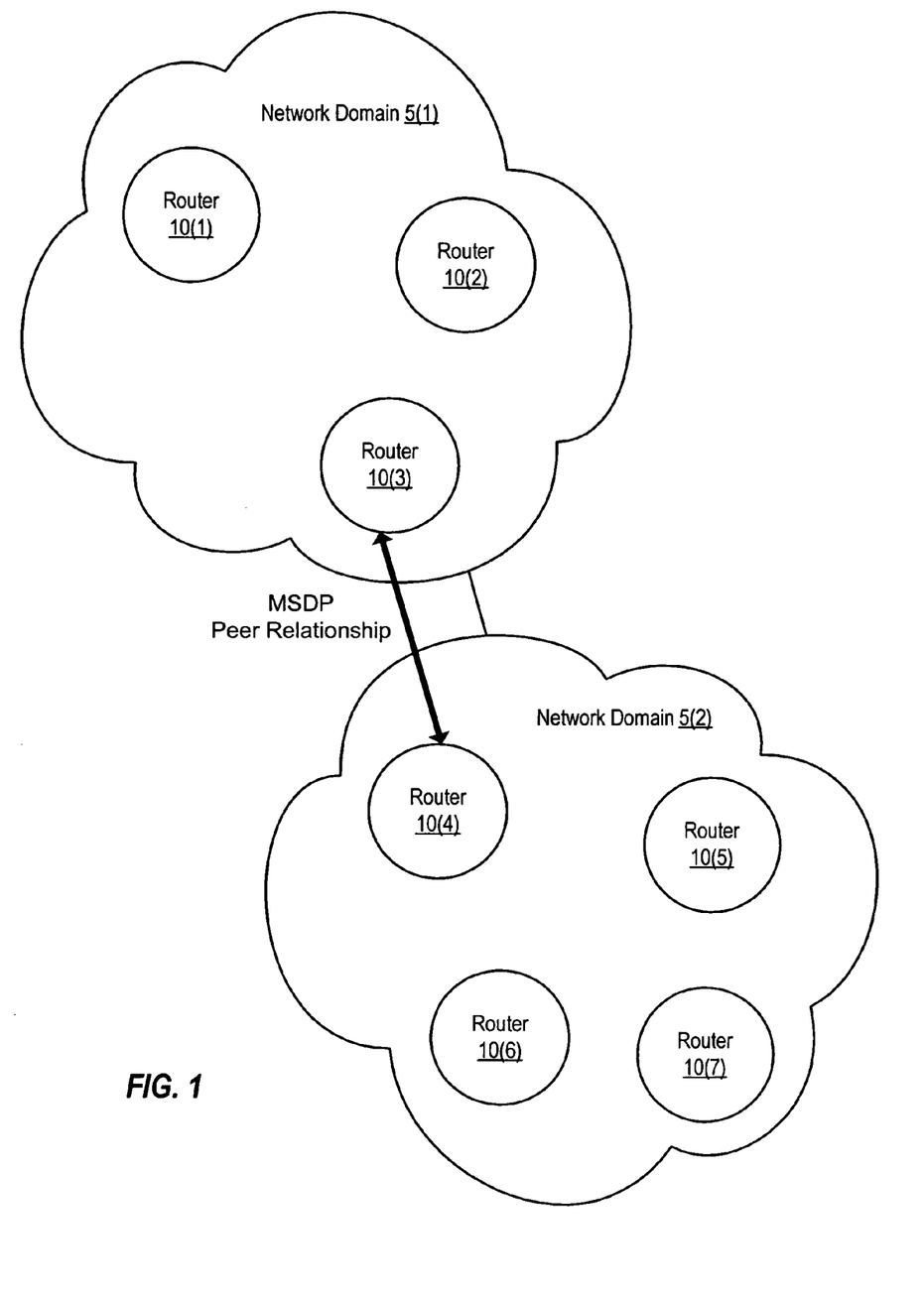
FIG. 1 is a block diagram of a network that includes a MSDP speaker configured to associate a key with a set of source address/group address pairs within a SA message, according to one embodiment of the present invention.

FIG. 1 is a block diagram of a network that includes a MSDP speaker configured to associate a key with a set of source address/group address pairs within a SA message. In this example, a network having multiple domains is illustrated. However, it is noted that the present invention can also be implemented within a single domain.

In the example of FIG. 1, network domain 5(1) is coupled to network domain 5(2). Network domain 5(1) includes routers 10(1)-10(3). Network domain 5(2) includes routers 10(4)-10(7). Network domains 5(1) and 5(2) can each include one or more local area networks (LANs), such as LAN 5, and/or wide area networks (WANs). Network domains 5(1) and 5(2) can be implemented using any (or a combination) of a variety of different media, including wireless links, coaxial cables, fiber optic cables, and the like. It is noted that one device (e.g., a router) can be coupled to another device either directly by a physical link or indirectly by, for example, a logical tunnel or several physical links and intervening network devices.

Routers 10(1)-10(7) (collectively, routers 10) include various network devices that perform routing functions and support a routing protocol. Each router 10(1)-10(7) maintains a routing table that stores routing information identifying routes to various data sources. Routers 10(1)-10(7) use one or more routing protocols to share information used to perform routing functions with each other by routinely (i.e., in a routine manner, such as at periodic intervals or in response to predesignated stimuli) sending routing information advertisements to each other. For example, routers 10 refresh MSDP information by routinely sending MSDP messages to each other.

As shown in FIG. 1, routers 10(3) and 10(4) have formed a MSDP peer relationship. Each of routers 10(3) and 10(4) implements the MSDP protocol (in other words, both routers are MSDP-speakers). The MSDP peer relationship can be established via a Transmission Control Protocol (TCP) connection. While the example of FIG. 2 shows the two routers being in different domains, it is noted that MSDP peers can also both be located within the same domain (e.g., for use in implementing anycast-RP).

Each MSDP speaker (i.e., each router that implements MSDP) sends one or more SA messages to all of its MSDP peers. Each SA message includes one or more multicast source address/group address pairs (i.e., pairs of addresses, also referred to as (S,G) pairs, that each include one address of a multicast source and one address of a multicast group to which the multicast source sends multicast messages). SA messages are sent in response to a MSDP speaker updating its Protocol Independent Multicast (PIM) routing information (e.g., in response to receiving a PIM register message or in response to receiving an SA message from another MSDP speaker). SA messages are also periodically resent in order to keep the SA information from expiring.

Whenever a MSDP speaker such as router 10(3) sends a SA message containing one or more source address/group address pairs to a MSDP peer, the MSDP speaker includes a key within the SA message. A given key can be associated with one or more source address/group address pairs. For example, in one embodiment, a key can be associated with a set of source address/group address pairs that share the same RP and are being sent to the same MSDP peer in a SA message. The MSDP peer receives the SA message and stores both the key and the associated source address/group address pairs. When the MSDP speaker wants to refresh the source address/group address pairs, the MSDP speaker can simply resend the key, without also sending the associated source address/group address pairs. Receipt of a SA message that contains the key, but not any. associated source address/group address pairs, causes the MSDP peer to refresh the SA information that is associated with that key.

In some embodiments, a MSDP speaker can also update SA information using a key. For example, a field within a SA message can be used to indicate whether source address/group address pairs are being added to or removed from the set of source address/group address pairs associated with the key. The MSDP speaker can send a SA message that includes this field, along with the key and the source address/group address pair(s) to add or remove from the set. Other source address/group address pairs within the set that are not being modified do not need to be included in this SA message.

MSDP hello messages can include a field that indicates whether the sending MSDP speaker is configured to use keys in SA messages. Thus, when routers 10(3) and 10(4) establish an MSDP peer relationship, the routers can exchange MSDP hello messages that indicate that each router is capable of using keys. If both routers in the peer relationship have identified themselves as being capable of using keys, keys will be used. Otherwise, conventional SA messages, which lack keys, will be used to convey SA information between the peers.

Figure 2A:
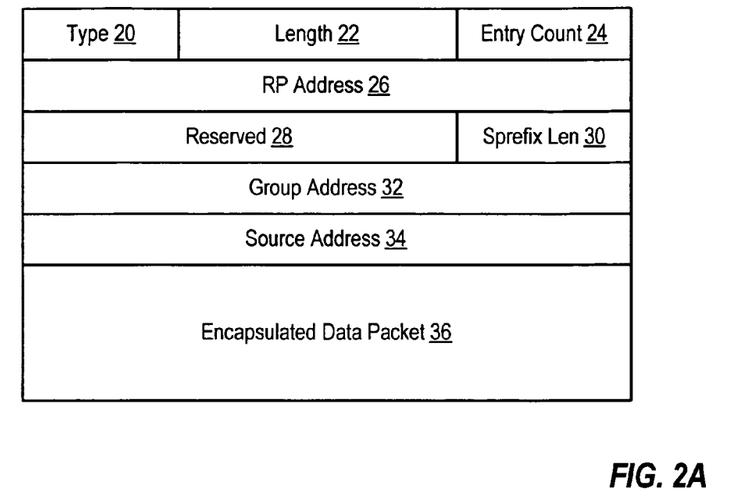
FIG. 2A is a block diagram of a conventional message that contains a source address/group address pair.
Figure 2B:
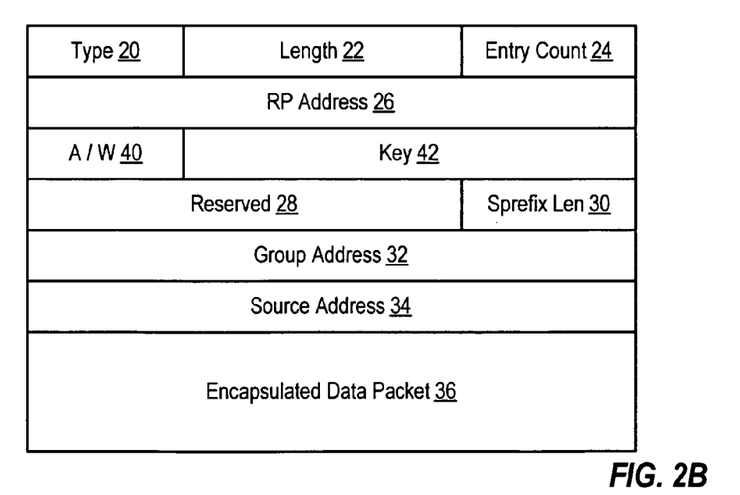
FIG. 2B is a block diagram of a message that contains a key and a set of source address/group address pairs associated with the key, according to one embodiment of the present invention.

FIG. 2A is a block diagram of a conventional SA message that contains a set of source address/group address pairs. FIG. 2A is provided to illustrate how a message that includes a key, as shown in FIG. 2B, differs from a conventional message. As shown, the SA message of FIG. 2A is implemented using a type-length value (TLV) structure. The SA message includes a type field 20, a value field 22, an entry count 24, a rendezvous point (RP) address 26, a reserved field 28, a source address prefix length 30 (abbreviated "sprefix len"), a group address 32, a source address 34, and an encapsulated data packet 36. Reserved field 28, sprefix len field 30, group address field 32, and source address field 34 are used to convey a source address/group address pair (however, if multiple pairs are included in a single SA message, the SA message will not include the encapsulated data packet 36 or only the last pair will have encapsulated data). If multiple source address/group address pairs are encoded in the SA message, reserved field 28, sprefix len field 30, group address field 32, and source address field 34 are repeated for each different SA message. It is noted that each different source address/group address pair within a given SA message will be associated with the same RP, since the RP address field 26 is only presented once within the SA message, regardless of the number of source address/group address pairs included within the SA message. Source address/group address pairs associated with different RPs will be sent in different SA messages.

Type field 20 is a byte that indicates the type (SA) of the message. Length field 22 identifies the number of octets within the message. Entry count identifies the number of source address/group address pairs within the SA message. Sprefix len field 30 indicates the length of the source address prefix. Group address field 32 identifies the address of a multicast group, and source address field 34 identifies the address of a multicast source that sends multicast messages to the multicast group identified in group address field 32. Encapsulated data packet field 36 can store a PIM register message associated with the source and group address.

FIG. 2B is a block diagram of a message that contains a key and a source address/group address pair, according to one embodiment of the present invention. It is noted that other embodiments can include fewer or additional fields, in addition to and/or instead of the fields shown here.

As shown, the message of FIG. 2B includes each of the fields that are present in a conventional SA message. Additionally, the message of FIG. 2B includes add/withdraw (A/W) field 40 and key 42.

Key 42 stores a unique value that identifies the set of one or more source address/group address pairs included in the SA message. A given MSDP speaker will calculate a different key for each RP and MSDP peer relationship. For example, if an MSDP speaker has one MSDP peer and identifies 15 RPs, the MSDP speaker will calculate 15 keys. Various mechanisms, such as routing filters, can cause the set of source address/group address pairs associated with a given RP to vary among different peers, so keys will differ both on a per RP and a per peer basis.

A/W field 40 stores information identifying whether any source address/group address pairs are being added to or withdrawn from the set of source address/group address pairs associated with the key. For example, the first time that an MSDP speaker sends a SA message containing a particular key (and thus the first time that the MSDP speaker sends a message identifying the RP that corresponds to that key), the MSDP speaker can set the value of A/W field 40 to indicate that the accompanying source address/group address pair(s) should be added to the set of source address/group address pairs associated with the key. If some of this SA information later expires, the MSDP speaker can include only the expired source address/group address pair(s) in a SA message, and set the value of A/W field 40 to indicate that the accompanying source address/group address pair(s) should be withdrawn from the set of SA information associated with the key. Similarly, if additional source address/group address pairs are later discovered for a particular RP, the MSDP speaker can send the new source address/group address pairs (but not the existing source address/group address pairs) in a SA message in which the value of A/W field 40 indicates that the accompanying source address/group address pairs should be added to the existing set of SA information associated with the key.

SA information is considered to be modified if 1) any source address/group address pair is created (e.g., in response to receipt of a PIM register message specifying that source address/group address pair) or expires (e.g., due to that pair not being refreshed within the most recent timeout interval). SA information can also be modified whenever new filters or route-maps that affect the SA information are installed on the MSDP speaker.

When a MSDP peer receives a message indicating that a particular source address/group address pair should be removed from a set, the MSDP peer will allow the identified source address/group address pair to expire locally. This may in turn cause the peer to send SA messages to other peers, indicating that the expired source address/group address pair should be withdrawn.

It is noted that some embodiments may not implement A/W field 40. Instead, such embodiments may simply resend the entire set of source address/group address pairs whenever information within the set changes (e.g., because a new source address/group address pair is discovered for the RP, or because an existing source address/group address pair expires).

Additionally, some alternative embodiments can repeat A/W field 40 for each source address/group address pair, allowing SA messages to be both added and withdrawn within the same SA message. For example, a single SA message could indicate that one source address/group address pair should be withdrawn from the set, while also indicating that another source address/group address pair should be added to the set.

Figure 2C:
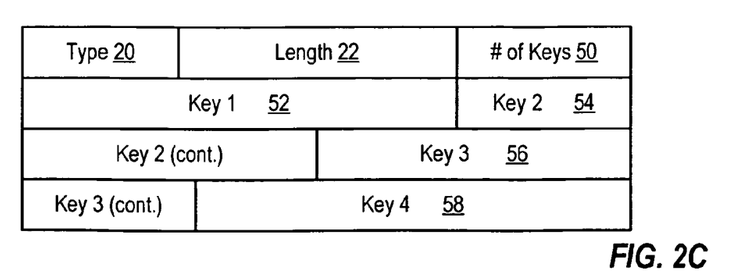
FIG. 2C is a block diagram of a message that contains keys that are associated with a set of source address/group address pairs, according to one embodiment of the present invention.

FIG. 2C is a block diagram of a MSDP message that contains keys that are associated with a set of source address/group address pairs. It is noted that other embodiments can include fewer or additional fields, in addition to and/or instead of the fields shown here.

In this example, the MSDP message includes a type field 20 and length field 22, like the SA message of FIG. 2B. However, instead of including the other fields shown in FIG. 2B, the MSDP message of FIG. 2C simply includes a number of keys (abbreviated "# of Keys") field 50 and one or more key fields such as fields 52, 54, 56, and 58. The MSDP message shown in FIG. 2C can be sent whenever a MSDP speaker wants to refresh one or more sets of source address/group address pairs that have not been modified.

Number of keys field 50 identifies how many keys are included in the MSDP message. In the example of FIG. 2C, there are four keys in the MSDP message. In other embodiments, other numbers of keys can be included. As shown, field 52 stores Key 1, field 54 stores Key 2, field 56 stores Key 3, and field 58 stores Key 4.

Figure 3A:
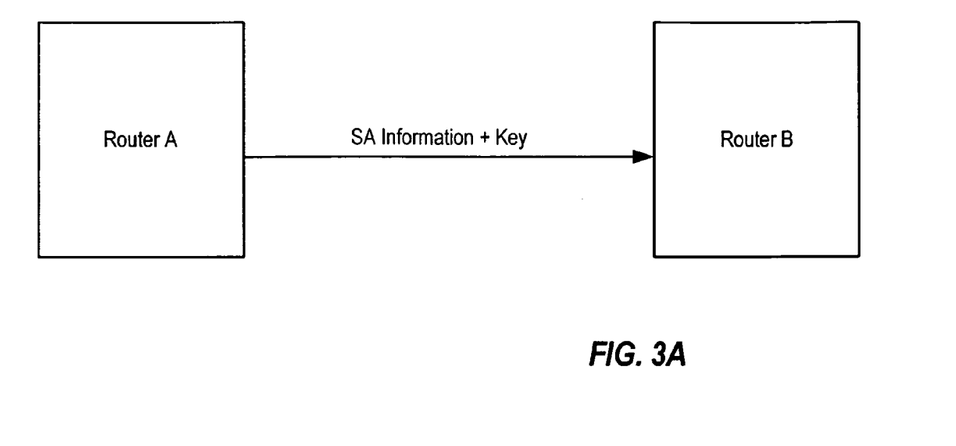
FIGS. 3A and 3B are block diagrams illustrating how an MSDP speaker can convey MSDP information to a MSDP peer, according to one embodiment of the present invention.
Figure 3B:
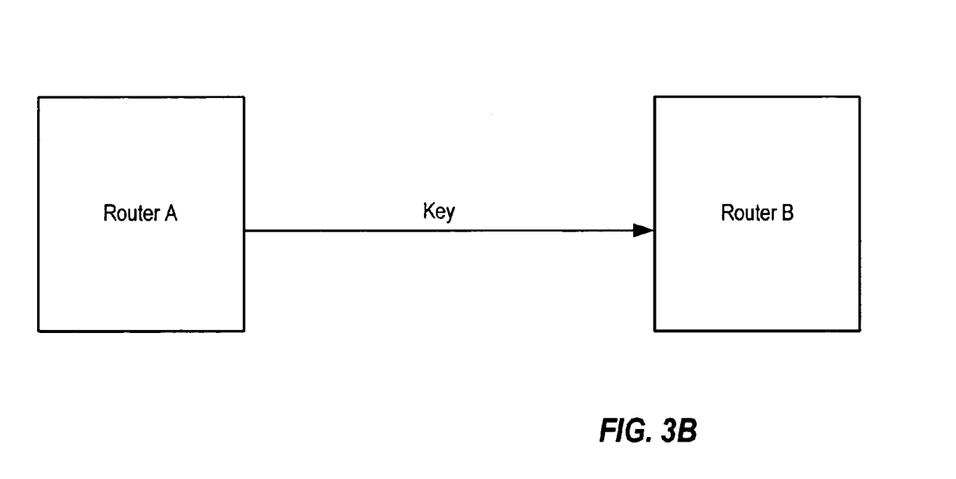

FIGS. 3A and 3B are block diagrams illustrating how an MSDP speaker can convey MSDP information to a MSDP peer using keys. In FIG. 3A, two routers, Router A and Router B, have established an MSDP peer relationship.

Initially, Router A sends SA information to Router B in one or more SA messages, which each include one or more source address/group address pairs and a key. In particular, for each RP for which Router A maintains SA information, Router A sends a SA message that includes one or more source address/group address pairs and a key, as shown in FIG. 3A. Router A generates a different key for each RP. Router A can use a MSDP message format such as the one shown in FIG. 2B to the source address/group address pairs and the key to Router B.

Router B receives the set of source address/group address pairs and the associated key within each SA message. Router B stores the source address/group address pairs and associates that information with the key (e.g., by appending the key to the information).

In FIG. 3B, Router A determines that a particular set of SA information has not changed, but that the SA information should be resent to Router B in order to prevent that information from expiring at Router B. In order to refresh that set of SA information at Router B, Router A simply sends the key associated with that set, without also sending the source address/group address pairs included in the set, to Router B. Router A can use a MSDP message format similar to that shown in FIG. 2C to send the key. Router B receives the key and responsively refreshes the set of SA information that is associated with that key.

Figure 4:
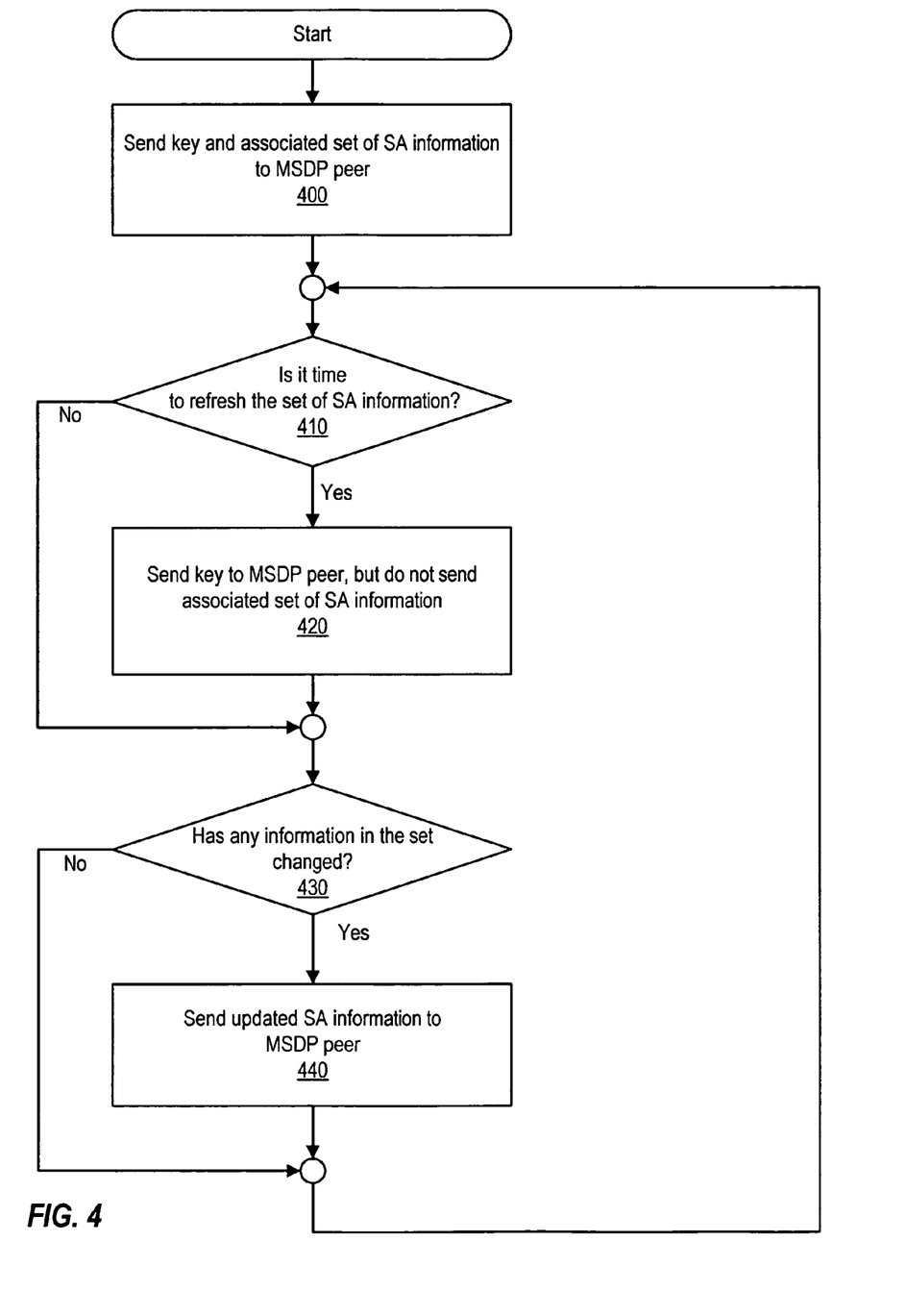
FIG. 4 is a flowchart illustrating how a MSDP speaker sends MSDP information to a MSDP peer, according to one embodiment of the present invention.

FIG. 4 is a flowchart illustrating how a MSDP speaker can send MSDP information to a MSDP peer. This method can be performed by a router that implements MSDP.

The method begins at 400, when the router sends a key and an associated set of source address/group address pairs to a MSDP peer. The key and set of source address/group address pairs can be sent in an SA message such as the one illustrated in FIG. 2B.

At 410, the router determines whether it is time to refresh the set of SA information (the source address/group address pairs) associated with the keys. If so, the router sends the key, without also sending the associated set of source address/group address pairs, to the MSDP peer, as shown at 430.

At 430, the router detects updates to the SA information. If any information within the set has changed (e.g., if any additions, deletions, or modifications of information in one of the SA messages have occurred), the router updates the information at the MSDP peer, as shown at 440. The updated information can be sent in a variety of ways. For example, in one embodiment, the router can simply resend the entire set of source address/group address pairs, including the modified information, along with the key.

In another embodiment, the router can use a flag (such as the A/W field of FIG. 2B) to indicate that accompanying source address/group address pair(s) should be added to or withdrawn from the set of SA information. In such an embodiment, the router simply sends the key, the flag, and the modified portion of the set to the MSDP peer, without having to resend the entire set of SA information. If a source address/group address pair has been modified, the router can first withdraw the old version of the source address/group address pair, and then add the new version of the source address/group address pair.

Figure 5:
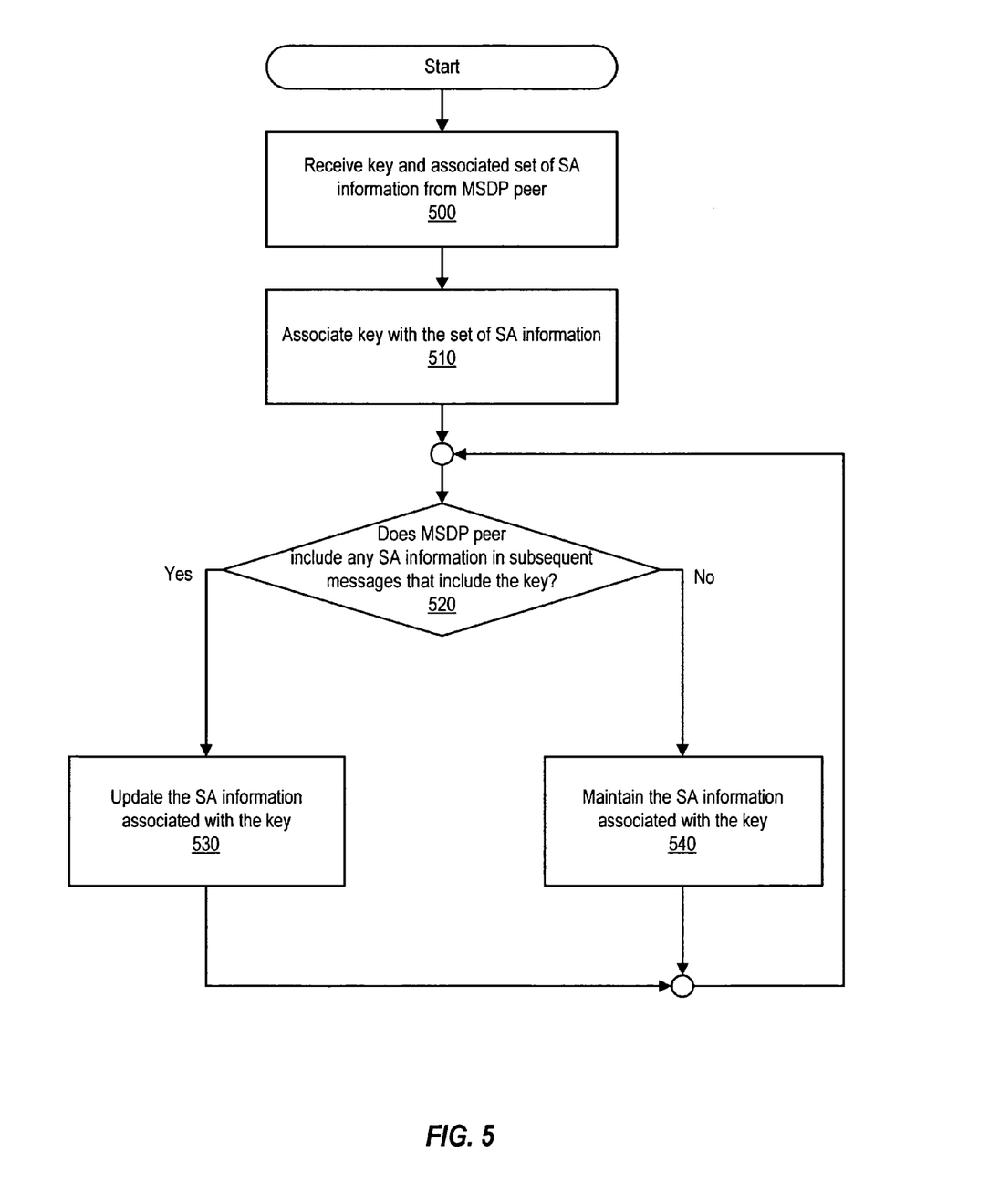
FIG. 5 is a flowchart illustrating how a MSDP peer handles information received from a MSDP speaker, according to one embodiment of the present invention.

FIG. 5 is a flowchart illustrating how a MSDP peer can handle SA information received from a MSDP speaker. This method can be performed by a router that implements MSDP.

The method begins at 500, when the router receives a key and associated set of source address/group address pair(s) from an MSDP peer. In response to receiving the key and the SA information, the router stores the set of SA information and associates the set with the key, as shown at 510. The router can associate the SA information with the key by, for example, appending the key to each source address/group address pair included in the SA information.

The router can receive subsequent MSDP messages that specify the key received at 500. If these MSDP messages include source address/group address pair(s) (as opposed to simply including the key), it indicates that some of the information within the set of SA information associated with the key may have changed. Accordingly, if such messages are detected at 520, the router will update the SA information that is currently associated with the key, as shown at 530. For example, if an A/W field is included in a SA message, the router can add and/or remove source address/group address pair(s) from the set as specified by the value of the A/W field.

If no such MSDP message has been received, the router maintains the information that is currently associated with the key, as shown at 540. For example, if the router receives the key, but not any SA information, in a subsequent MSDP message, the router can refresh the SA information that is currently associated with the key. If the router does not receive the key within a timeout interval, the router will allow the SA information that is associated with the key to expire.

Figure 6:
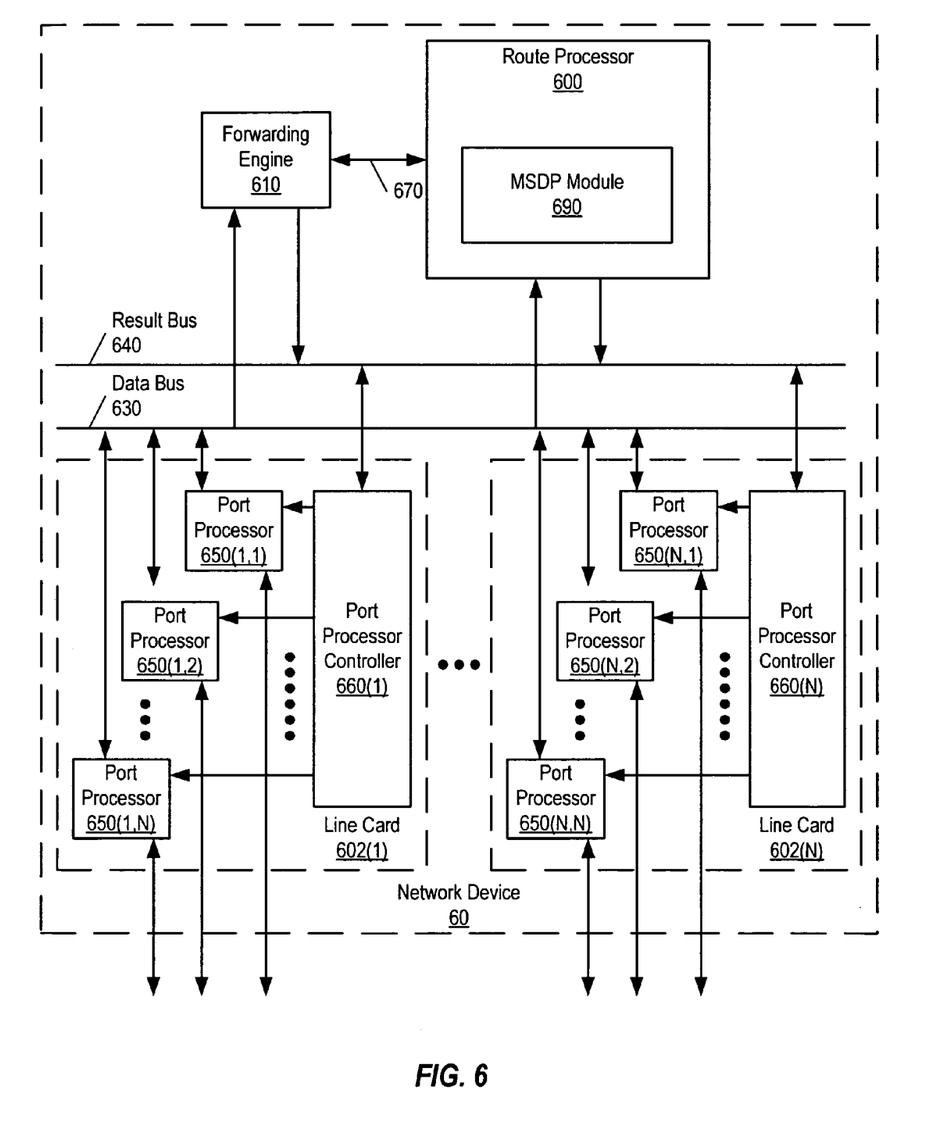
FIG. 6 is a block diagram of a network device that is configured to implement MSDP, according to one embodiment of the present invention.

FIG. 6 is a block diagram of a network device 60 (e.g., one of routers 10(1)-10(7) of FIG. 1). In this depiction, network device 60 includes a number of line cards (line cards 602(1)-602(N)) that are communicatively coupled to a forwarding engine 610 and a route processor 600 via a data bus 630 and a result bus 640. Routing processor 600 includes MSDP module 690, which implements the MSDP protocol using keys associated with sets of SA information, as described above. For example, MSDP module 690 can implement at least some of the functionality of the flowcharts of FIGS. 4 and 5 and generate and receive MSDP messages such as those shown in FIGS. 2B and 2C.

Line cards 602(1)-602(N) include a number of port processors 650(1,1)-650(N,N) which are controlled by port processor controllers 660(1)-660(N). It will also be noted that forwarding engine 610 and route processor 600 are not only coupled to one another via data bus 630 and result bus 640, but are also communicatively coupled to one another by a communications link 670. It is noted that in alternative embodiments, each line card can include a forwarding engine.

When a message is received, the message is identified and analyzed by a network device such as network device 60 in the following manner, according to embodiments of the present invention. Upon receipt, a message (or some or all of its control information) is sent from the one of port processors 650(1,1)-650(N,N) at which the message was received to one or more of those devices coupled to data bus 630 (e.g., others of port processors 650(1,1)-650(N,N), forwarding engine 610 and/or route processor 600). Handling of the message can be determined, for example, by forwarding engine 610. For example, forwarding engine 610 may determine that the message should be forwarded to one or more of port processors 650(1,1)-650(N,N). This can be accomplished by indicating to corresponding one(s) of port processor controllers 660(1)-660(N) that the copy of the message held in the given one(s) of port processors 650(1,1)-650(N,N) should be forwarded to the appropriate one of port processors 650(1,1)-650(N,N).

Figure 7:
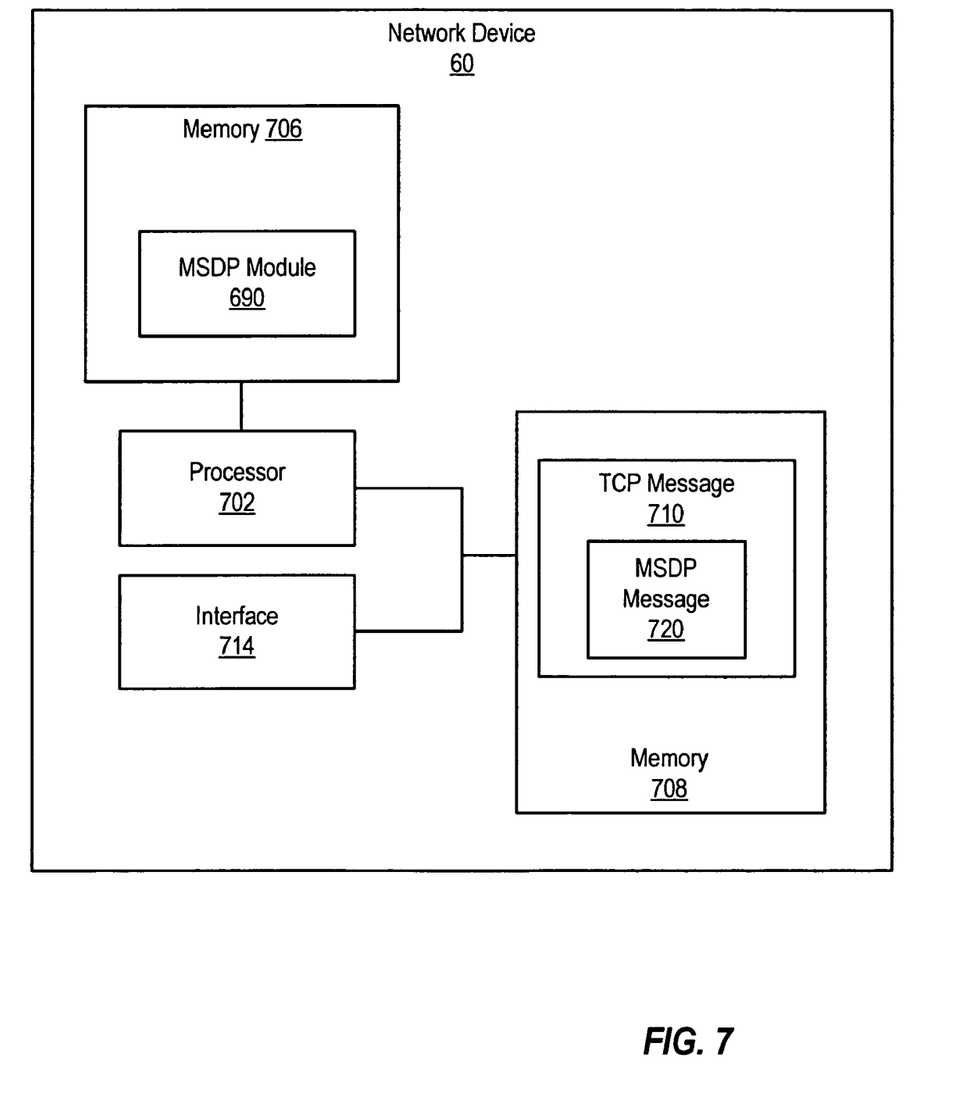
FIG. 7 is another block diagram of a network device, according to one embodiment of the present invention.

FIG. 7 illustrates a block diagram of a network device 60 (e.g., one of routers 10(1)-10(7) of FIG. 1), which illustrates how MSDP module 690 (as shown in FIG. 6) can be implemented in software. As illustrated, network device 60 includes one or more processors 702 (e.g., microprocessors, PLDs (Programmable Logic Devices), or ASICs (Application Specific Integrated Circuits)) configured to execute program instructions stored in memory 706. Memory 706 can include various types of RAM (Random Access Memory), ROM (Read Only Memory), Flash memory, MEMs (Micro Electro-Mechanical Systems) memory, and the like. Processor 702 and memory 706 can be included in a route processor (e.g., route processor 600 of FIG. 6). Processor 702 and memory 706 are coupled to send and receive data and control signals by a bus or other interconnect.

Network device 60 also includes an interface 714 (e.g., one of port processors 650(1,1)-650(N,N) of FIG. 6). In response to receiving a message (e.g., such as TCP message 710, which encapsulates MDSP message 720), interface 714 can store copies of the received messages in memory 708. Processor 702, interface 714, and memory 708 are coupled to send and receive data and control signals by a bus or other interconnect.

In this example, program instructions executable to implement MSDP module 690 are stored in memory 706. Additionally, MSDP state information (e.g., such as SA information) can be stored in memory 706 for use by MSDP module 690. The program instructions and data implementing MSDP module 690 can be stored on various computer readable media such as memory 706. In some embodiments, MSDP module software is stored on a computer readable medium such as a CD (Compact Disc), DVD (Digital Versatile Disc), hard disk, optical disk, tape device, floppy disk, and the like). In order to be executed by processor 702, the instructions and data implementing MSDP module 690 are loaded into memory 706 from the other computer readable medium. The instructions and/or data implementing MSDP module 690 can also be transferred to network device 60 for storage in memory 706 via a network such as the Internet or upon a carrier medium. In some embodiments, a computer readable medium is a carrier medium such as a network and/or a wireless link upon which signals such as electrical, electromagnetic, or digital signals, on which the data and instructions implementing MSDP module 690 are encoded, are conveyed.

For purposes of this disclosure, a "message" may include a cell, datagram, frame, packet, segment, or any other logical group of information that is conveyed via a network. Network devices perform switching and routing functions in order to convey messages from a source to a destination along a path.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   generating a key, wherein
      the key comprises a unique value that identifies a set of Source Active (SA) information, wherein
         the set of SA information comprises at least one address pair, wherein
            the at least one address pair comprises a multicast source address and a multicast group address; and
   sending a first message to a Multicast Source Discovery Protocol (MSDP) peer, wherein
      the first message comprises
         the set of Source Active (SA) information, and
         the key that identifies the set of SA information.

2. The method of claim 1, further comprising:
   identifying that none of the information in the set has been modified; and sending a second message to the MSDP peer, wherein
the second message comprises the key but not the set of SA information.

3. The method of claim 2, further comprising:
identifying that information within a second set of SA information has not been modified; and
sending a second key, associated with the second set, to the MSDP peer, wherein
both the key and the second key are sent to the MSDP peer in the second message.

4. The method of claim 2, further comprising:
identifying that a first address pair within the set has expired; and
sending the first address pair, the key, and a flag to the MSDP peer, wherein
the flag identifies that the first address pair should be removed from the set.

5. The method of claim 2, further comprising:
identifying that a new address pair has been added to the set; and
sending the new address pair, the key, and a flag to the MSDP peer, wherein
the flag identifies that the new address pair should be added to the set.

6. A method comprising:
receiving a first message including a set of Source Active (SA) information and a key from a MSDP peer, wherein the set of SA information comprises at least one address pair comprising a multicast source address and a multicast group address;
storing information indicating that each address pair included in the set of SA information is associated with the key;
receiving a second message including a first address pair, the key, and a flag from the MSDP peer, wherein the flag identifies that the first address pair should be removed from the set; and
allowing the first address pair to expire, in response to receiving the second message.

7. The method of claim 6, further comprising:
receiving a third message including the key, but not the set of SA information, from the MSDP peer; and
preventing the set of SA information from expiring, in response to receiving the third message.

8. The method of claim 7, further comprising:
receiving a fourth message including a new address pair, the key, and a flag from the MSDP peer, wherein the flag identifies that the new address pair should be added to the set; and
storing information indicating that the new address pair is associated with the key.

9. A node comprising:
an interface; and
a MSDP module coupled to the interface, wherein
the MSDP module is configured to generate a key, wherein the key comprises a unique value that identifies a set of Source Active (SA) information, wherein the set of SA information comprises at least one address pair, wherein the at least one address pair comprises a multicast source address and a multicast group address,
the MSDP module is configured to send a message comprising the set of SA information to a MSDP peer via the interface, and
the message further comprises the key that identifies the set.

10. The node of claim 9, wherein the MSDP module is configured to:
identify whether any information in the set has been modified; and
send a second message to the MSDP peer via the interface, wherein
if no information in the set has been modified, the second message comprises the key but not the set of SA information.

11. The node of claim 10, wherein
the second message comprises a plurality of keys, and
each of the keys is associated with a respective set of SA information.

12. The node of claim 10, wherein the MSDP module is configured to:
identify that a first address pair within the set has expired; and
send a third message to the MSDP peer via the interface, wherein
the third message comprises the first address pair, the key, and a flag, and
the flag identifies that the first address pair should be removed from the set.

13. The node of claim 10, the MSDP module is configured to:
identify that a new address pair has been added to the set; and
send a third message to the MSDP pair via the interface, wherein
the third message comprises the new address pair, the key, and a flag, and
the flag identifies that the new address pair should be added to the set.

14. A node comprising:
an interface configured to receive a first message and a second message, wherein
the first message comprises a set of Source Active (SA) information and a key from a MSDP peer,
the set of SA information comprises at least one address pair comprising a multicast source address and a multicast group address,
the second message comprises a first address pair, the key, and a flag, and
the flag identifies that the first address pair should be removed from the set; and
a MSDP module coupled to the interface, wherein
the MSDP module is configured to store information indicating that each address pair included in the set of SA information is associated with the key, and
the MSDP module is configured to allow the first address pair to expire, in response to reception of the second message.

15. The node of claim 14, wherein
the interface is configured to receive a third message including the key, but not the set of SA information, from the MSDP peer; and
the MSDP module is configured to prevent the set of SA information from expiring, in response to reception of the third second message.

16. The node of claim 15, wherein
the interface is configured to receive a fourth message including a new address pair, the key, and a flag from the MSDP peer, wherein
the flag identifies that the new address pair should be added to the set; and the MSDP module is configured to store information indicating that the new address pair is associated with the key.

17. A system comprising:
means for generating a key, wherein
the key comprises a unique value that identifies a set of Source Active (SA) information, wherein
the set of SA information comprises at least one address pair, wherein
the at least one address pair comprises a multicast source address and a multicast group address; and
means for sending the set of SA information to a MSDP peer and the key that identifies the set of SA information.

18. A system comprising:
means for receiving a first message including a set of Source Active (SA) information and a key from a MSDP peer, wherein
the set of SA information comprises at least one address pair comprising a multicast source address and a multicast group address;
means for storing information indicating that each address pair included in the set of SA information is associated with the key;
means for receiving a second message including a first address pair, the key, and a flag from the MSDP peer, wherein the flag identifies that the first address pair should be removed from the set; and
means for allowing the first address pair to expire, in response to reception of the second message.

19. A system comprising:
a first node; and
a second node coupled to the first node, wherein
the first node is configured to generate a key, wherein the key comprises a unique value that identifies a set of Source Active (SA) information, wherein the set of SA information comprises at least one address pair, wherein the at least one address pair comprises a multicast source address and a multicast group address,
the first node is configured to send a message comprising the set of SA information to the second node, and
the message further comprises the key that identifies the set.

20. The system of claim 19, wherein
the second node is configured to store information indicating that each address pair included in the set of SA information is associated with the key, in response to reception of the message.

21. The system of claim 19, wherein the first node is configured to:
identify that none of the information in the set has been modified; and
send a second message to the second node, wherein
the second message comprises the key but not the set of SA information.

22. The system of claim 21, wherein
the second node is configured to prevent the set of SA information from expiring, in response to reception of the second message.

23. A method comprising:
generating a key, wherein
the key comprises a unique value that identifies a set of Source Active (SA) information, wherein
the set of SA information comprises at least one address pair, wherein
the at least one address pair comprises a multicast source address and a multicast group address; and
sending a message comprising the set of SA information to a MSDP peer, and
the message further comprises the key that identifies the set; and
storing the information indicating that each address pair included in the set of SA information is associated with the key, in response to reception of the message by the MSDP peer.

24. The method of claim 23, further comprising:
identifying that none of the information in the set has been modified; and
sending a second message to the MSDP peer, wherein
the second message comprises the key but not the set of SA information.

25. The method of claim 24, wherein
preventing the set of SA information from expiring, in response to reception of the second message by the MSDP peer.

* * * * *